US012786919B2

(12) United States Patent
Ayers et al.

(10) Patent No.: US 12,786,919 B2
(45) Date of Patent: Nov. 3, 2026

(54) MULTIPLE SUBSCRIBER IDENTIFIERS WITH A DEFAULT JURISDICTIONAL PROFILE

(71) Applicant: HEWLETT PACKARD ENTERPRISE DEVELOPMENT LP, Houston, TX (US)

(72) Inventors: John I. Ayers, Omaha, NE (US); Mathew M. Kaippallimalil, Plano, TX (US); Tiffany Moore, Omaha, NE (US); Laura Lynn Podlasek, Houston, TX (US); Vijay Umakanth Borkar, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 995 days.

(21) Appl. No.: 17/975,474

(22) Filed: Oct. 27, 2022

(65) Prior Publication Data

US 2024/0147400 A1 May 2, 2024

(51) Int. Cl.
*H04W 60/00* (2009.01)

(52) U.S. Cl.
CPC .................................. *H04W 60/00* (2013.01)

(58) Field of Classification Search
CPC ............................... H04W 60/00; H04W 8/18
See application file for complete search history.

(56) References Cited

U.S. PATENT DOCUMENTS 5,488,714 A 1/1996 Skidmore
6,421,250 B1 7/2002 Kim et al.
7,079,991 B2 7/2006 Li et al.
7,197,748 B2 3/2007 Chaiken et al.
7,784,038 B2 8/2010 Charlebois et al.
8,255,972 B2 8/2012 Azagury et al.
8,515,488 B2 * 8/2013 Hillier ..................... H04W 8/26 455/418
9,146,677 B2 9/2015 Svendsen
2005/0075106 A1 * 4/2005 Jiang ....................... H04W 8/18 455/435.3
2005/0174349 A1 8/2005 Watson
2015/0031356 A1 * 1/2015 Gupta ..................... H04W 8/06 455/433
2023/0292349 A1 * 9/2023 Lee ....................... H04W 76/15

FOREIGN PATENT DOCUMENTS

WO WO-2014020237 A1 * 2/2014 ............ H04W 88/14
WO 2021/104547 A1 6/2021

* cited by examiner

*Primary Examiner* — Marcus Hammonds

(74) *Attorney, Agent, or Firm* — Sheppard Mullin Richter Hampton LLP

(57) ABSTRACT

The systems and method disclosed herein select a customized or default UE SIM profile for a registration with a particular network element in a specific jurisdiction based on the identification of the serving network element (e.g. MME, SGSN, S-CSCF). The default profile may be chosen over a particular subscriber identifier in various jurisdictions and types of networks. To implement the default profile, the subscription server may store a New Radio (NR) as a Secondary Radio Access Technologies (RAT) identifier, or "NR as a Secondary RAT" identifier, and set the value of the identifier as "ALLOW" or "DENY" of the default profile described herein.

16 Claims, 8 Drawing Sheets

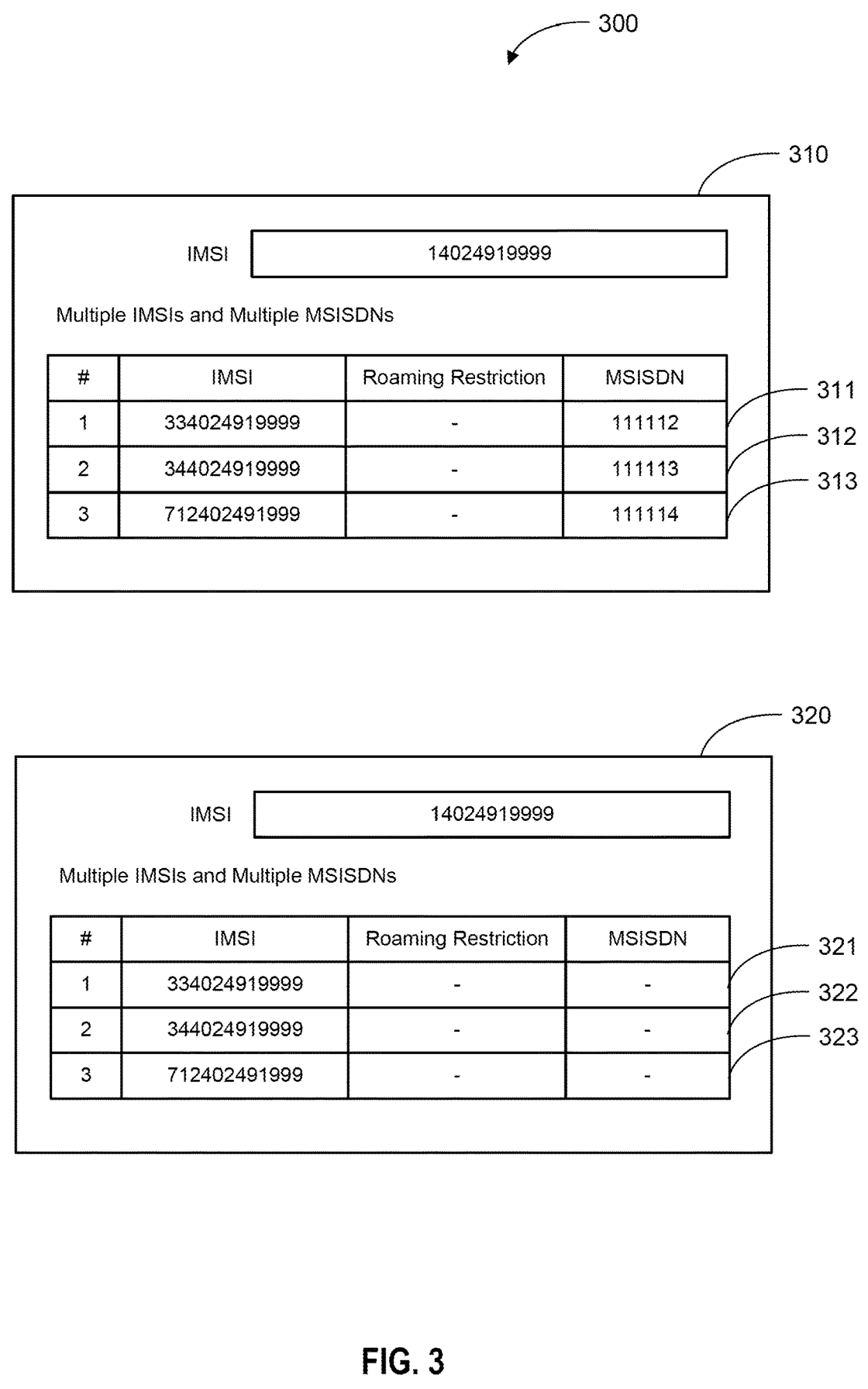

300

310

IMSI: 14024919999

Multiple IMSIs and Multiple MSISDNs

| # | IMSI | Roaming Restriction | MSISDN |
|---|---|---|---|
| 1 | 334024919999 | - | 111112 |
| 2 | 344024919999 | - | 111113 |
| 3 | 712402491999 | - | 111114 |

311, 312, 313

320

IMSI: 14024919999

Multiple IMSIs and Multiple MSISDNs

| # | IMSI | Roaming Restriction | MSISDN |
|---|---|---|---|
| 1 | 334024919999 | - | - |
| 2 | 344024919999 | - | - |
| 3 | 712402491999 | - | - |

321, 322, 323

FIG. 3

MULTIPLE SUBSCRIBER IDENTIFIERS WITH A DEFAULT JURISDICTIONAL PROFILE

BACKGROUND

Wireless devices (e.g., smart phones, tablets, and laptops) are used to send and receive data. Such data may be transmitted and received over a wireless network. The $5^{th}$ Generation (5G) is a standard promulgated by the International Telecommunication Union (ITU) and the 3rd Generation Partnership Project (3GPP), with the ITU setting the minimum requirements for 5G compliance, and the 3GPP creating the corresponding specifications. 5G is a successor to the 4G/Long Term Evolution (LTE) standard, and refers to the fifth generation of wireless broadband technology for digital cellular networks. 5G is intended to replace or augment 4G/LTE. Touted advantages of 5G include, e.g., exponentially faster data download and upload speeds, along with much-reduced latency (also referred to as "air latency," e.g., the time it takes for a device to communicate with the network).

The frequency spectrum of 5G includes three bands. The first band can be referred to as the low-band spectrum, i.e., the sub-1 GHz spectrum. This low-band spectrum is the primary band used by U.S. wireless carriers with data speeds reaching about 100 Mbps. The second band can be referred to as the mid-band spectrum, i.e., the sub-6 GHz spectrum, which provides lower latency (e.g., 4-5 milliseconds) and greater data speeds (e.g., up to 1 Gbps) relative to the low-band spectrum. However, mid-band signals are not able to penetrate structures, such as buildings, as effectively as low-band signals. The third band can be referred to as the high-band spectrum, or millimeter wave (mmWave), and operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 milliseconds). However, its coverage area (the distance it can transfer data) is less than that of the low-band and mid-band spectrums, due in part to poor building penetration. Use of mmWave technology may however, avoid already congested portions of the spectrum. So long as the limited coverage area is acceptable, the benefits of mmWave technology can still be realized.

5G coverage to provide services to users from any physical location requires deployment of 5G cells that provide full coverage. However, currently 5G has been partially deployed, resulting in coverage holes. Thus, 5G provides for interworking with the existing 4G/LTE networks that enables user equipment (UE) mobility between 5G and 4G/LTE networks as UEs move into and out of 5G coverage areas.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 illustrates UE profiles in association with the NR as Secondary RAT identifier at the HSS, in accordance with some examples of the disclosure.

Figure 1:
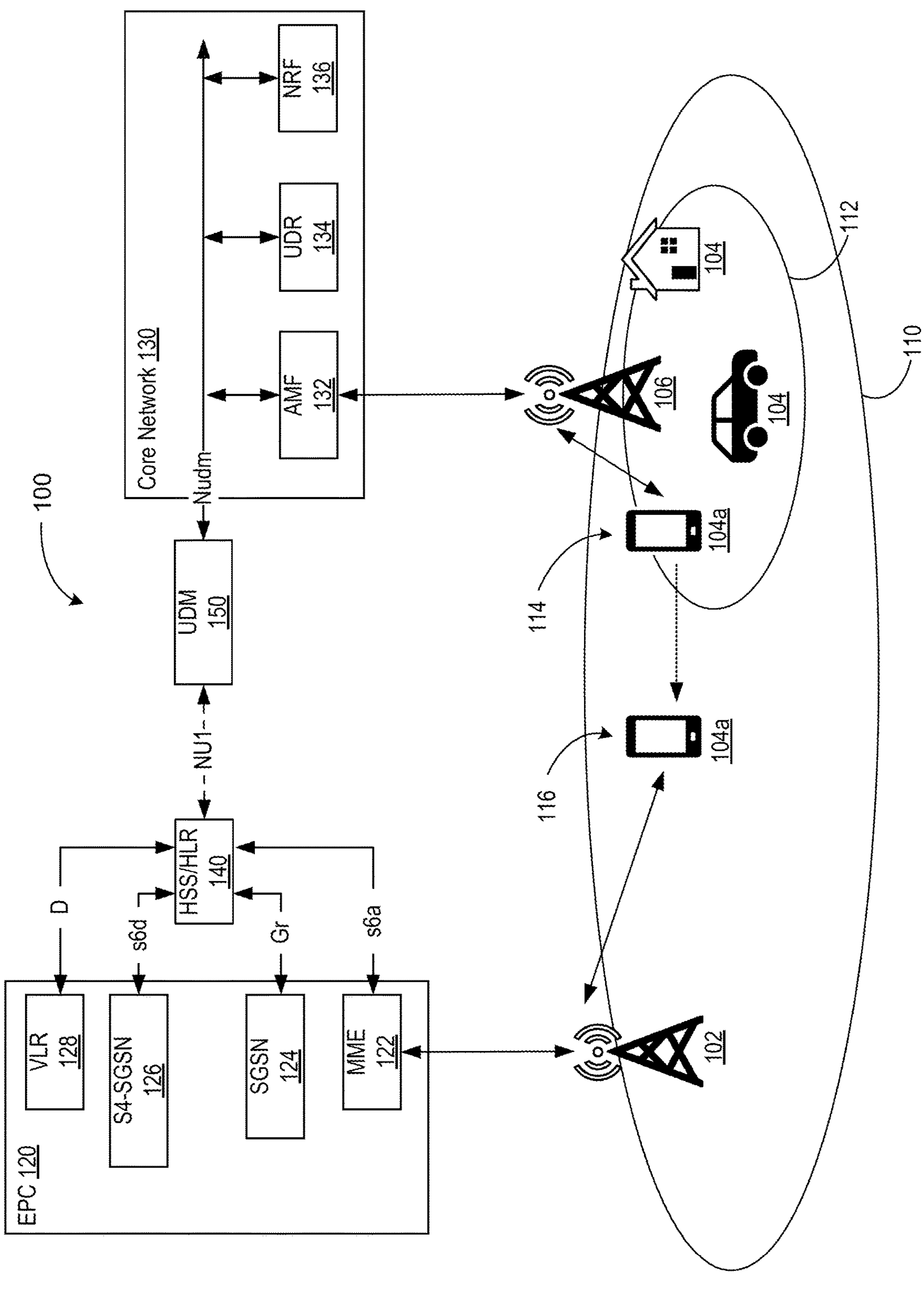
FIG. 1 illustrates an example cellular communication system.

The figures are not exhaustive and do not limit the present disclosure to the precise form disclosed.

DETAILED DESCRIPTION

A mobile network can be thought of as comprising two component networks, the radio access network (RAN) and the core network. In 5G cellular networking systems these components are a 5G access network (5G-AN) and a 5G core network (5GC) and in 4G/LTE cellular networking systems these components are radio access network (RAN) and an Evolved Packet Core Network (EPC). The 5GC may include various virtualized network functions (NFs), including, for example, Core Access and Mobility Management Function (AMF) in communication with a Unified Data Manager (UDM). The AMF is configured to handle connection and mobility management tasks. The UDM is configured to manage user authentication, authorization, and device registration on the 5GC. The EPC may include its own NFs, including, for example, a Mobility Management Entity (MME) in communication with a Home Subscriber Server (HSS). The MME provides connection management functionality between UEs and the EPC. NFs may be implemented as one or more network devices or apparatuses.

As a UE moves about the 4G/LTE AND 5G cellular networks, the UE is attached to different MMEs and legacy mobility management devices (e.g., Serving General Packet Radio Service (GPRS) Support Node (SGSN), Visitor Location Register (VLR), etc.).

Systems and methods described herein can improve mobile communications networks and devices by allowing mobile devices or other UEs to roam in different jurisdictions, and to access services that are tied to the UE's use of the communication network in those different jurisdictions. This can be accomplished in accordance with various examples, as will be described in greater detail below, by overriding a default profile for the second jurisdiction. Particularly, a UE may be associated with a first subscriber identifier (e.g., an international mobile subscriber identity (IMSI) or other subscriber identifier described herein). The first subscriber identifier may be configured for a primary jurisdiction and, when roaming, the UE may be associated with a second subscriber identifier configuration for that jurisdiction. The first subscriber identifiers are sometimes referred to as IMSIs and the second subscriber identifiers are sometimes referred to as MIMM IMSIs, or Multiple IMSI with Multiple MSISDN (MIMM) IMSIs, although these correlative terms are merely provided for illustrative purposes.

In some examples, other subscriber identifiers associated with the UE may be implemented without diverting from the essence of this disclosure. For example, the subscriber identifier may be replaced with the IMSI, Integrated Circuit Card Identifier (ICCID), International Mobile Equipment Identity (IMEI), or other unique identifier associated with the UE. In some examples, the subscriber identifier may correspond with a subscriberID (e.g., in a CDMA cellular class), Mobile Identification Number (MIN) string, or the International Roaming MIN (IRM). These terms are used interchangeably throughout the application.

The system may, in some examples, select a customized or default UE Subscriber Identity Module (SIM) profile for a registration with a particular network element in a specific jurisdiction based on the identification of the serving network element (e.g. MME, SGSN, S-CSCF). The default profile may be chosen over a particular MIMM IMSI in various jurisdictions and types of networks. In some examples, the network element may correspond with a device that transmits electronic requests and responses in the cellular network to other network devices, while the serving network element may currently manage the requests and response from the UE.

In some traditional systems, a UE SIM profile may automatically select a user's MSISDN from a list of active SIMs in order to implement the profile associated to that IMSI. In some examples, selecting a profile and IMSI combination may determine the IMSI based on the type of functionality that the UE is performing. By selecting the profile for the functionality, the profile may provide functionality for the UE that is best suited for delivery of a particular service or functionality (e.g., SMS text messaging) to help select the MSISDN complete the function.

In other traditional systems, a UE may correspond with a single SIM profile. The single profile may comprise various subscription data. In some examples, the primary profile may comprise a roaming restriction (RR) class of service (COS) that allows the UE to, if there is a match with the serving system, provide override data for the profile or choose to not download new data to apply to the default profile. In other systems, the UE SIM profile can be customized to override profile data for the particular jurisdiction, based on the location of the serving Network Element. To help with the customization, the Network Element's database profile record may be provisioned with the MIMM identity of the UE.

As discussed above, some examples select a customized or default UE SIM profile in association with a jurisdiction or location of the UE. To implement such a default UE SIM profile, the HSS may store a New Radio (NR) as a Secondary Radio Access Technology (RAT) identifier, or "NR as a Secondary RAT" identifier, and set the value of the identifier as "ALLOW" or "DENY" of the customized, default profile described herein. The values associated with the "NR as a Secondary RAT" identifier may be transmitted between the Network Element (e.g., MME) and the Home Subscriber Server (HSS) or other subscription server.

In some examples, the system may implement a generic roaming profile per subscriber identifier (e.g., IMSI), which can corresponding to a customized roaming COS for each of the MIMM identifiers. Based on the determining roaming COS for the particular IMSI, the system can further customize the individual profile to either change some of the downloaded profile that would normally be part of the default subscription, or override the downloaded data. This may be implemented on a per IMSI basis.

In some examples, the UE moves to a secondary jurisdiction and attaches to a network element (e.g., MME) physically located in that jurisdiction. The identification of the UE moving to the secondary jurisdiction may be identified when the UE sends a registration request to the network element and attaches to the network element. At this point, the UE may be located in the secondary jurisdiction. When the UE is located in the secondary jurisdiction, the network element physically located in that jurisdiction attaches with the UE using the IMSI in the request. The attachment may utilize the first subscriber identifier received from the UE and may or may not continue with other standard procedures implemented with the attachment process (e.g., authentication, etc.).

The HSS may include a database of correlations of first subscriber identifier and second subscriber identifiers, where each second IMSI may correspond to a different jurisdiction. The HSS may search through the database of correlations to find a record with matching first IMSIs. Based on the correlation, the UE can then be authorized to the second IMSI.

When the jurisdiction of the network element matches the jurisdiction of the secondary subscriber identifier stored at the HSS, the HSS may authorize the UE to access different services that are tied to the secondary subscriber identifier for that jurisdiction. Otherwise, the HSS may default to the first IMSI and not allow special services for the jurisdiction (e.g., the UE may be roaming outside their primary location). In this context and throughout the description, the first subscriber identifier and the second subscriber identifier may refer to any identifier available, including IMSI, ICCID, IMEI, subscriberID, and the like.

The UE subscriber identifier may be stored with the profile without reference to a sorting order or placement identifier of an ordering of the IMSIs available for the UE subscriber. For example, either the first subscriber identifier or the second subscriber identifier may refer to the primary IMSI, secondary IMSI, any of the alternate IMSIs, or default subscription. In this case, the terms "first" and "second" may not refer to a particular order, roaming COS, or jurisdiction. In some examples, there is no numbering order for those additional IMSIs associated with the user profile and the decision is made by the location/region/jurisdiction of UE attachment.

This process of storing the correlation between the first subscriber identifier and second subscriber identifiers at the HSS is especially advantageous in geographies where various countries and providers are in close proximity (e.g. Europe). For example, users of the UE can frequently experience handoffs and roaming issues in jurisdictions that are different from their home or base jurisdiction. When different jurisdictions are close together, the handoffs and roaming issues may result in more cross-jurisdiction travel, which in turn results in higher, unnecessary UE usage, or result in roaming charges and service offerings.

In some examples, accessing different services associated with the second IMS Is may be based on using an "NR as Secondary RAT" identifier. The access for each jurisdiction may be customized per each second subscriber identifier to allow overriding of the default subscription (e.g., a first IMSI) via the corresponding MIMM RR COS. Hence, when a user switches a SIM card at the UE and the new SIM card uses a different MIMM IMSI to receive services, the corresponding customized roaming configuration used for Roaming Access can also be extended to additionally provide "NR as Secondary RAT" identifier that includes an access or denial value, thus allowing or preventing access to additional services for a given IMSI in a particular roaming area.

Roaming and selection of different IMSIs (e.g., using one SIM card at the UE) may be optimized in different jurisdictions. For example, some systems may utilize more than one SIM card, thus allowing both Home Public Land Mobile Network (HPLMN) and Visiting Public Land Mobile Network (VPLMN) services on different SIMs to be serviced at the same time. In comparison to these systems, the systems and methods described herein may enable selecting a customized UE SIM profile to override values for a given registration in a specific jurisdiction of service. The specific jurisdiction of service may be based on the MME, SGSN, S-CSCF, or other serving network element for that telecommunication network. As such, the disclosure may not rely on a predetermined or ordered list of a user's IMSIs (or MSISDN), but rather, customizes the selection of the user's MSISDN from a list of active IMSIs within a jurisdiction.

Additionally, a selection of profile data may override the current profile for the IMSI. For example, the profile data may be based on the UE's current jurisdiction and corresponding network element's DB profile record for a MIMM identity. For example, the system may allow for each of the MIMMs to use a corresponding ROAMING COS that additionally utilizes a MIMM ROAMING DB to potentially select a Network's preference DB record to override subscriber profile data in a customized fashion.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing the details of the various implementations disclosed herein, it would be beneficial to describe an example cellular network to which the aforementioned UE may connect. FIG. 1 illustrates an example cellular communication system 100 in which or with which various implementations of the present disclosure may be implemented. The cellular communications system may comprise multiple cellular components including a plurality of base stations or cells (e.g., base stations 102 and 106), devices 104, an Evolved Packet Core (EPC) 120, and another core network 130 (e.g., a 5GC).

In some examples, EPC 120 is a framework for providing converged voice and data on a 4G Long-Term Evolution (LTE) network. 2G and 3G network architectures process and switch voice and data through two separate sub-domains, which can include circuit-switched (CS) for voice and packet-switched (PS) for data. The base stations 102 may include macrocells (high power cellular base station) and/or small cells (low power cellular base station). These are examples of a cellular communication system describe a 4G/5G network are for illustrative purposes only and should not limit the essence of the disclosure to being restricted to these protocols. Any telecommunication network may be implemented without diverting from the essence of the disclosure.

In the illustrative example of FIG. 1, base station 102 is configured according to 4G/LTE standards and interfaces with the EPC 120 through an S1 interface. Base station 106 is configured according to 5G standards and interfaces with core network 130 through an N1/N2 interface. The base stations 102 and 106 may wirelessly communicate with one or more UEs 104. Each of the base stations 102 and 106 may provide communication coverage for a respective geographic coverage area 110 and 112, respectively. There may be overlapping geographic coverage areas. For example, the base station 102 may have a coverage area 110 that overlaps the coverage area 112 of one or more other base stations, such as base station 106 as shown.

While a single base station 102 (e.g., a 4G/LTE configured base station) and a single base station 106 (e.g., a 5G configured base station) are illustrated, the cellular communication systems disclosed herein are not limited thereto. One or more base stations 102 and/or one or more base stations 106 may be provided. For example, a plurality of base stations 102 may be provided, each having a respective coverage area 110. One or more of the respective coverage areas 110 may overlap. Similarly, a plurality of base stations 106 may be provided, each having a respective coverage area 112. One or more of the respective coverage areas 112 may overlap. Furthermore, one or more coverage areas 110 may overlap with one or more coverage areas 112.

Base stations 102 and 106 may include an eNB, gNodeB (gNB), or another type of base station. Some base stations, such as base station 106, may operate in the frequency spectrum of 5G, including the low-band spectrum, i.e., the sub-1 GHz spectrum; the mid-band spectrum, i.e., the sub-6 GHz spectrum; and/or the high-band spectrum, e.g., millimeter wave (mmWave) that operates between 25 GHz and 100 GHz.

EPC 120 includes various network function entities, including, for example but not limited to, one or more network elements, illustrated as Mobility Management Entity (MME) 122, a Serving Gateway (S-GW) (not shown), a Packet Data Network (PDN) Gateway (not shown), among other network function entities. Although MME 122 is illustrated in FIG. 1, MME or mobility management device (MMD) may correspond with any type of network element, including a Serving General Packet Radio Service (GPRS) Support Node (SGSN), a S4-SGSN, and a Visitor Location Register in various examples, and these terms are used interchangeably throughout the disclosure.

Each network element 122 may be in communication with a Home Subscriber Server (HSS) 140 over a designated interface, for example, a s6a interface used for exchange of authentication, location, and server information about subscribers between the HSS 140 and network element 122. Each network element 122 may function as a control node that processes signaling between the UEs 104 and the EPC 120, including providing bearer and connection management functionality. The Packet Data Network (PDN) Gateway may be connected to IP Services, such as the Internet, an intranet, an IP Multimedia Subsystem (IMS), a Packet-Switched (PS) Streaming Service, and/or other IP services.

The NFs of EPC 120 may be implemented as computing systems, such as one or more servers. The NFs of the EPC 120 may communicate using protocols, such as the Diameter Protocol and/or Mobile Application Part (MAP) of the SS7 protocol. For example, the Diameter Protocol may be used for messages between the network element and the HSS (e.g., MME and HSS), while MAP may be used for messages between a Home Location Repository (HLR) and a SGSN or VLR. Data included in the messages on the EPC may be formatted according to American Standard Code for Information Interchange (ASCII) protocols.

Core network 130 may include various virtualized network functions (NFs), including, for example but not limited to, an Authentication Server Function (AUSF) (not shown), Core Access and Mobility Management Function (AMF) 132, a policy control function (PCF) (not shown), a session management function (SMF) (not shown), and a Unified Data Repository (UDR) 134, Network Repository Function (NRF) 136, to name a few. AMF 132 is the control node that processes the signaling between UEs 104, via base station 106, and core network 130.

AMF 132 may receive connection and mobility management tasks from UEs 104, and can handle connection and mobility management tasks, while forwarding session management tasks/messages to a Session Management Function (SMF). AMF 132 may be in communication with UDM 150 over a service-based interface (SBI) for UDM 150, such as a Nudm interface.

Core network 130 may also include NRF 136, which provides for network function service registration, authorization, and discovery, and otherwise enables network functions to identity one another. Core network 130 may also include a User Plane Function (UPF) (not shown) that is connected to IP Services, which may include the Internet, an intranet, an IMS, a PS Streaming Service, and/or other IP services.

The NFs of core network 130 may be implemented as computing systems, such as one or more servers. The NFs of core network 130 may communicate using protocols, such as HyperText Transfer Protocol (HTTP). Communications and operations may be sent, for example, using HTTP methods, such as POST, PATCH, GET, PUT, etc.

As noted herein, AMF 132 may receive connection and session-related information from UEs across N1/N2 reference point interfaces (between UE and AMF/between RAN and AMF), but may handle connection and mobility management tasks. That is, an AMF instance may be specified by a UE, e.g., UE 104, in a Non-Access Stratum (NAS) message that is routed to the AMF instance by the RAN. Performing the role of an access point to the 5G core network (terminating the RAN control plane and UE traffic), the AMF instance may authenticate the UE and manage, e.g., handovers, for the UE between access points, base stations, and gNBs.

UDM 150 provides services to other functions of the Service-Based Architecture (SBA), such as AMF 132 and other network functions. UDM 150 may store information in local memory. UDM 150 may also store information externally, for example, within UDR 134. UDM 150 may provide authentication credentials while being employed by AMF 132 to retrieve subscriber data and access registration context data.

Although the preceding description may provide examples based on 5GC and 4G/LTE, it should be appreciated that the concepts described therein may be applicable to other communication technologies. For example, the concepts described herein may be applicable to legacy networks, such as, GPRS, CDMA, GSM, and/or other wireless technologies in which a UE may operate. For example, EPC 120 may include network functions of the legacy networks. GPRS core networks included a SGSN configured to perform functions similar to network element 122. EPC 120 may include or be communicably coupled to a SGSN 124 that communicates with the HSS 140 via a designated interface, such as, a Gr interface for routing information between the SGSN 124 and the HSS/HLR 140. In some GPRS core networks, an S4-SGSN is used for performing functions similar to network element 122. EPC 120 may include or be communicably coupled to a S4-SGSN 126 that communicates with HSS 140 via a designated interface, such as, a s6d interface used for exchange of authentication, location, and server information about subscribers between HSS 140 and S4-SGSN 126. GSM core networks include a Visitor Location Register (VLR) configured to perform functions similar to the network element 122 and a HLR performing functions similar to HSS 140. EPC 120 may include or be communicably coupled to VLR 128 that communicates with HSS 140 via a designated interface, such as a D interface used for routing information between a VLR 128 and the HSS/HLR 140.

The term "network element" or "mobility management device" (or MMD) will be used herein to refer to one or more of an MME, SGSN, S4-SGSN, VLR, or similar network function entity included in the EPC, while "legacy mobility management device" will be used herein to refer to one or more of SGSN, S4-SGSN, VLR and the like. Additionally, "location and service information interface" may be used to refer to one or more of the s6a, s6d, D, Gr, or similar interfaces between the HSS and a respective mobility management device.

Base stations 102 and/or 106 provide an access point to EPC 120 or core network 130 for UE 104. Examples of UEs 104 include cellular phones, a smart phones, laptop computers, tablet computers, personal computers, vehicle-implemented communication devices (e.g., vehicles having vehicle-to-vehicle (V2V) capabilities), multimedia devices, game consoles, wearable devices, or any other similar functioning device. Some of UEs 104 may be referred to as IoT devices (e.g., parking meter, gas pump, toaster, vehicles, heart monitor, etc.). Each UE is able to move about the cellular network system 100 into and out of respective coverages areas (e.g., coverage area 110 and 112).

As noted herein, 5G provides for interworking with the existing EPC providing for mobility of UEs between 5G and 4G/LTE networks. Accordingly, 5G provides for service migration by attaching to and from each network as the UE moves into and out of coverage areas. Thus, interworking between the networks allows for migration of attachment between the 5GC and EPC through communication between UDM 150 and HSS 140 via a NU1 interface.

For example, as shown in FIG. 1, UE **104*a* (illustrative depicted as a mobile smartphone) moves from first position 114, in coverage area 112, to second position 116, out of coverage area 112, as shown by the dotted arrow. If UE 104*a* is capable of receiving 5G services, while present in coverage area 112, UE 104*a* may be registered with and attached to AMF 132. Upon moving out of coverage area 112 to the 4G coverage area 110, UE 104*a* will attempt to attach to EPC 120 via a registration request to the network element 122. Once registered and attached to network element 122, UE 104*a* is able to receive 4g/LTE services via EPC 120**.

An interworking facilitates the transition between networks to ensure that seamless transition is achieved. For 5G and EPC interworking, there are two solutions: single registration solution and dual registration solution. With the single registration, the UE **104*a* is permitted to attach to one of the EPC or 5G networks at any point in time. Accordingly, a UE attachment status (e.g., an EPC access registration context) may be exchanged through a control interface between the networks, for example, between the HSS 140 to UDM 150 over a NU1 interface when the attachment status of UE 104*a* is updated. As used herein, connectivity information may be used to refer to EPC access registration context. With dual registration, UE 104*a*** may be registered to both the EPC or 5GC at any point in time, and thus the EPC access registration context need not be exchanged.

As an illustrative example, FIG. 1 shows UE 104*a* at first position 114, at which point the UE 104*a* is registered with AMF 132 for receiving 5G services. When UE 104*a* moves to second position 116, UE 104*a* moves out of the 5G coverage area 112 and needs to attach to EPC 120 to receive 4G/LTE services. To do so, UE 104*a* issues a registration request to a mobility management device of EPC 120 and the mobility management device sends an update location request (ULR) to the HSS 120, via a respective location and service information interface. For example, an Update Location Request is transmitted according to the Diameter Protocol and an Update Location is transmitted according to the MPA protocol. The term "update location request" or "ULR" will be used herein to refer to an Update Location Request sent under the Diameter protocol and/or an Update Location sent under the MAP protocol. HSS 120 checks subscriber data to confirm UE 104*a* is permitted to attach to EPC 120 and other subscription information and, if so, issues an Update Location Answer to the mobility management device. Based on the Update Location Answer, UE 104*a* is registered with and attached to the mobility management device for rendering of 4G/LTE services.

The ULR includes an indicator, for example, bit 8 in the ULR-Flag attributed-value pair (AVP), that notifies HSS 140 as to whether or not the mobility management device is configured for dual registration. When the mobility management device is not configured for dual registration, this indicator in the ULR is not set. Upon receipt of the ULR from the mobility management device, HSS 140 transmits a deregistration notification message (e.g., Nudm_UECM_DeregistrationNotification) to UDM 150 which delivers the deregistration notification message to the registered AMF 132 (if any). Receipt of the deregistration notification message triggers the receiving AMF 132 to deregister UE 104*a* due to mobility from core network 130 to EPC 120.

As noted above, 5G provides for interworking with the existing 4G/LTE networks providing, among other functionality, for mobility of UEs between the 5GC and the EPC. 5G and 4G/LTE are generally mutually exclusive, such that a UE may not be attached to the EPC and the 5GC at the same time (except where the networking function of the EPC is set for dual registration). In case that the networks are mutually exclusive, the 4G/LTE does not have access to 5GC attachment status of the UEs on attached to the EPC. Accordingly, in the case of migration of services from the 5GC to the EPC, the EPC may notify the 5GC that a UE is attached to the EPC and instruct the 5GC to deregister the UE and cancel 5G services. For example, when a UE attempts to attach to the EPC, the network element serving the UE initiates a registration call flow to attach the UE to the EPC for 4G/LTE services. This call flow includes, among other functions and operations, requesting registration with the EPC. Responsive to the registration request, the network element issues an Updated Location Request (ULR) to the HSS, which may then inject a deregistration notification message into the 5GC. The deregistration notification message is provided to the UDM and delivered to the AMF. The AMF then deregisters the UE from the 5G cellular network, thereby cancelling 5G services rendered thereto.

Figure 2:
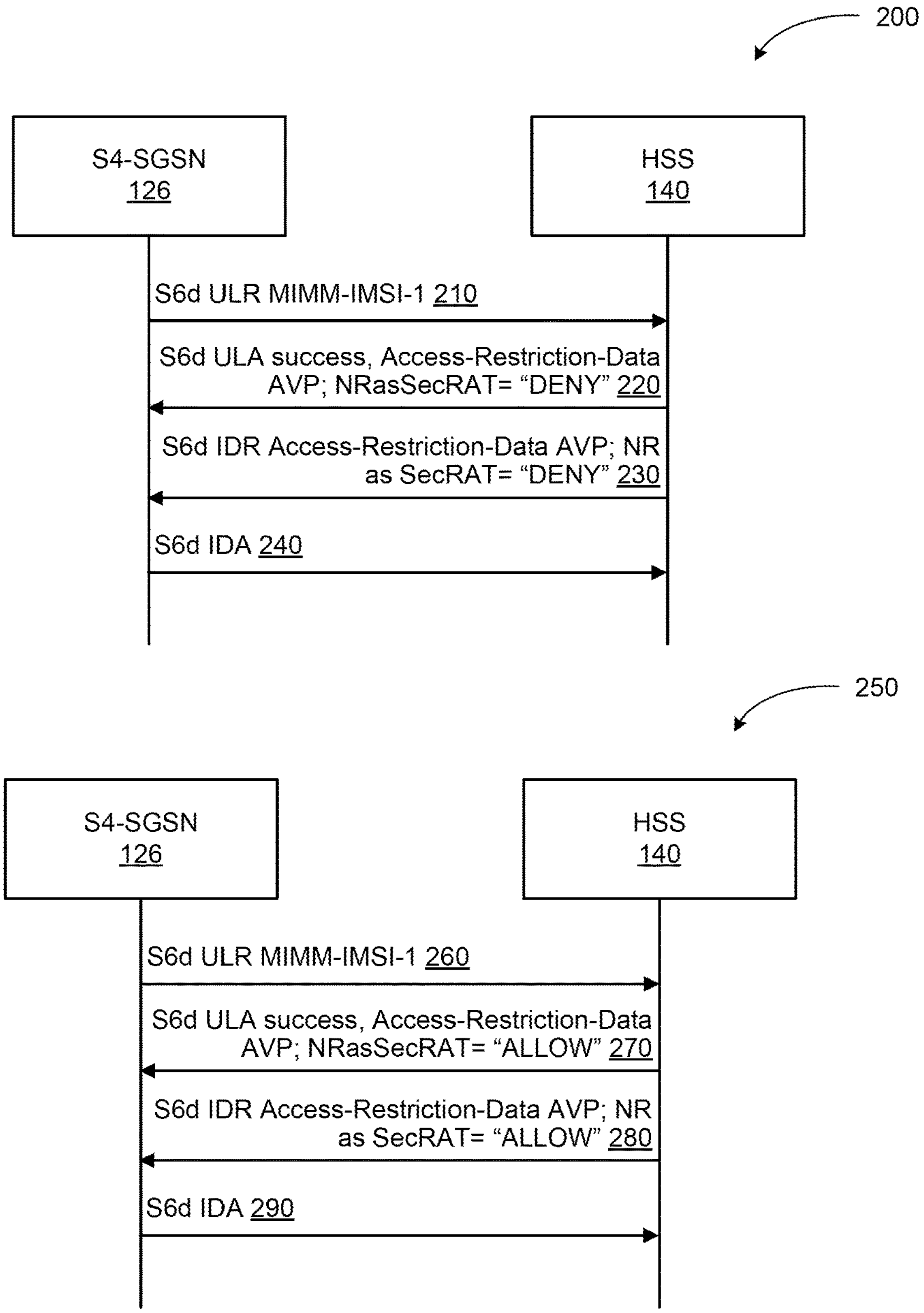
FIG. 2 illustrates two examples of attachment processes using the NR as a Secondary RAT identifier, in accordance with the implementations disclosed herein.

FIG. 2 illustrates two examples of attachment processes using the NR as a Secondary RAT identifier, in accordance with the implementations disclosed herein. In illustration 200, UE 104*a* may attempt to attach to EPC 120 via a registration request to network element 122 as illustrated in FIG. 1. Once registered and attached to network element 122, UE 104*a* is able to receive 4G/LTE services via EPC 120.

The registration request may include a "primary IMSI" as a first MIMM IMSI, and network element 122 may automatically perform various operations. Such operations can include initiating one or more roaming checks (using the corresponding MIMM RR COS) and comparing a RAT type to predetermined RAT types to verify access authentication (using the corresponding MIMM RR COS). In this example, network element 122 may be provisioned with Evolved Packet System (EPS) Subscription data and configured with "NR as Secondary RAT" identifier and a value of "ALLOW" for the primary IMSI. The user may also have a Primary RR COS that alters the "NR as Secondary RAT" identifier with a value of "DENY" (or similar value) for various regions outside the primary region. Additionally, the EPS Subscription has various MIMM RR COS configured with "NR as Secondary RAT" identifier with a value of "ALLOW" (or similar value).

Example 200 illustrates a communication exchange between S4-SGSN 126 to HSS 140 where the "NR as Secondary RAT" identifier corresponds with a value of "DENY" or the "NR as Secondary RAT" identifier is not implemented. In these examples, the default profile may not be overridden and the UE operates in accordance with the default profile while the UE is located in the particular jurisdiction. The UE SIM profile may correspond with the IMSI for a given registration in the particular jurisdiction of service.

Additionally, S4-SGSN 126 to HSS 140 are communicating, the S6d interface is provided as an example. However, the S6a interface may be implemented when S4-SGSN 126 is replaced with an MME, for example, in other protocol implementations. These other implementations may be provided without diverting from the scope of the disclosure.

At block 210, the update-location-request (ULR) message may be transmitted from S4-SGSN 126 to HSS 140. The ULR message may comprise the MIMM-IMSI-1 value associated with the profile of the UE attaching to the network element (e.g., for the default profile or for the profile of the particular jurisdiction where the UE is located).

At block 220, the update-location-answer (ULA) message may be transmitted from HSS 140 to S4-SGSN 126. The ULA message may request to Access-Restriction-Data Attribute-Value-Pair (AVP) and may include a value of the "NR as Secondary RAT" identifier to "DENY".

At block 230, the Insert Subscriber Data Request (IDR) message may be transmitted from HSS 140 to S4-SGSN 126. The IDR message may request to Access Restriction Data AVP and include a value of the "NR as Secondary RAT" identifier to "DENY".

In some examples, the ULA process may be implemented upon receiving the ULA message in order to download subscription information. The subscription information may include which services are allowed for access, including Code-Division Multiple Access (CDMA), Evolved High Rate Packet Data (eHRPD), Generic Access Network (GAN), Global Enhanced Radio Access Network (GERAN), GSM/Edge Radio Access Network, handover (HO) to non-3GPP, High Rate Packet Data (HRPD), Internet High Speed Packet Access variations (e.g., I-HSPA Evol), Evolved UMTS Terrestrial Radio Access Network (E-UTRAN), narrowband-IOT (NB), wideband-IOT (WB), new radio (NR) as a Secondary RAT, NR in a Fifth Generation System (NR in 5GS), Ultra Mobile Broadband (UMB), UMTS Terrestrial Radio Access Network (UTRAN), Virtual, WB E-UTRAN, or Wireless Local Area Network (WLAN), to name a few. When the profile changes, HSS 140 downloads the latest information to the switch (e.g., identifying which of these services is enabled as "DENY" or "ALLOW" values), which can constitute the IDR. In some examples, the downloaded information may continue to include a "DENY" or "ALLOW" value for the "NR as Secondary RAT" identifier, for example, even though changes to the subscription information may have taken place for other service access and jurisdictions.

At blocks 220 and 230, HSS 140 constructs the Access-Restriction-Data AVP (e.g., as a result of a profile change to Access Restriction data within the UE's subscription). When constructing the Access-Restriction-Data AVP, HSS 140 may download each configured access type using the EPS Subscription data values. Since no "NR as Secondary RAT" identifier is used or the "NR as Secondary RAT" identifier value is set to "DENY," no override process is performed. In some examples, there is a default profile change that triggers update messages to be generated from HSS 140 to notify the serving network element (e.g. MME and/or SGSN) also performs the logic described herein to potentially allow the jurisdiction information to override the "NR as Secondary RAT" value of the default profile.

At block 240, the Insert Subscriber Data Answer (IDA) message may be transmitted from S4-SGSN 126 to HSS 140. In some examples, the IDA message may comprise an acknowledgement of the IDR and indicate a "success" or "failure" flag, although these are merely examples and should not be limiting to the disclosure.

Example 250 illustrates a communication exchange between S4-SGSN 126 to HSS 140 where the "NR as Secondary RAT" identifier corresponds with a value of "ALLOW". In these examples, the default profile may be customized to override profile data for the particular jurisdiction based on the location of the serving Network Element. The network element's database profile record may be provisioned for the MIMM identity. Additionally, as discussed with example 200, since S4-SGSN 126 to HSS 140 are communicating, the S6d interface is provided as an example. However, the S6a interface may be implemented when S4-SGSN 126 is replaced with an MME, for example, in other protocol implementations. These other implementations may be provided without diverting from the scope of the disclosure.

At block 260, the ULR message may be transmitted from S4-SGSN 126 to HSS 140. The ULR message may comprise the MIMM-IMSI-1 value associated with the profile of the UE attaching to the network element.

At block 270, the ULA message may be transmitted from HSS 140 to S4-SGSN 126. The ULA message may request to Access-Restriction-Data AVP and include a value of the "NR as Secondary RAT" identifier to "ALLOW".

In some examples, when constructing the Access-Restriction-Data AVP, HSS 140 may download all configured access types using the EPS Subscription data values. Since the "NR as Secondary RAT" identifier is used or the "NR as Secondary RAT" identifier value is set to "ALLOW," an override process may be performed. For example, HSS 140 may access the PRIMARY IMSI's RR COS or the "NR as Secondary RAT" identifier to allow the corresponding MIMM RR COS to be used to override the "NR as Secondary RAT" identifier of the Access-Restriction-Data AVP.

In some examples, a provisioning change may be made at the EPS to alter the MIMM's RR COS value from "COS Y" to "COS Z" that results in HSS 140 downloading profile data (e.g., to generate the IDR message). The downloading process may be triggered by the RR COS change. In some examples, HSS 140 may use the MIMM IMSI's RR COS instead of the Primary IMSI's RR COS to perform override functionality for the "NR as Secondary RAT" attribute of the Access-Restriction-Data AVP. The result of applying the newly provisioned MIMM's RR COS (e.g. COS Z) may override the subscriber's default profile value corresponding to the "NR as Secondary RAT" value. This override value may be different from the initial override value that was performed during previous attachment via the ULR/ULA process using the previous MIMM's RR COS (e.g. COS Y).

At block 280, the IDR message may be transmitted from HSS 140 to S4-SGSN 126. The IDR message may request to Access Restriction Data AVP and include a value of the "NR as Secondary RAT" identifier to "ALLOW".

In some examples, HSS 140 is provisioned with EPS Subscription data and configured with "NR as Secondary RAT" as "ALLOW" for the primary IMSI of the UE. In some examples, the UE may correspond with a Primary RR COS that alters the "NR as Secondary RAT" to "DENY" for various regions. In some examples, the EPS Subscription data includes various MIMM RR COS configured with "NR as Secondary RAT" as "ALLOW."

Other processes may also be performed with the invocation of the ULR/ULA logic. In these examples, the appropriate roaming COS may be applied to the MIMM rather than the default subscription's roaming COS or the primary IMSI's roaming COS. The subscription change may be identified through additional IDR messages being transmitted from HSS 140 to S4-SGSN 126 that identify the change to the "NR as Secondary RAT" identifier value.

At block 290, the IDA message may be transmitted from S4-SGSN 126 to HSS 140. The IDA message may acknowledge the profile download via the IDR. In some examples, the distinction between the before/after scenarios in the IDA would arise if an MIMM's RR COS was altered that results in a different value for the "NR as Secondary RAT" to be computed.

FIG. 3 illustrates UE profiles in association with the NR as Secondary RAT identifier at the HSS, in accordance with some examples of the disclosure. In example 300, first UE profile 310 may not implement the NR as Secondary RAT identifier at HSS 140 (or set the identifier to "DENY") and second UE profile 320 may implement the NR as Secondary RAT identifier at HSS 140.

In first UE profile 310, the system may implement a multiple SIM single operator MIMM service to link multiple SIMs for a user to a shared account or profile. As shown, the individual IMSI values corresponding to the individual SIMs can be manually set to different MSISDN values, as shown in first example 311, second example 312, and third example 313. For example, a first IMSI is 334024919999 with a first MSISDN set to 111112 in first example 311, a second IMSI is 344024919999 with a second MSISDN set to 111113 in second example 312, and a third IMSI is 712402491999 with a third MSISDN set to 111114 in third example 313.

In second UE profile 320, the system may implement the NR as Secondary RAT identifier at HSS 140. As shown, the individual IMSI values can be left blank, so that no MSISDN value is set, as shown in first example 321, second example 322, and third example 323. Rather, the customized or default UE SIM profile may be identified for a registration with a particular network element in a specific jurisdiction based on the identification of the serving network element (e.g. MME, SGSN, S-CSCF), which is permissible by not defining the same MSISDN value in these user interfaces. The default profile may be chosen over a particular MIMM IMSI in various jurisdictions and types of networks.

Figure 4:
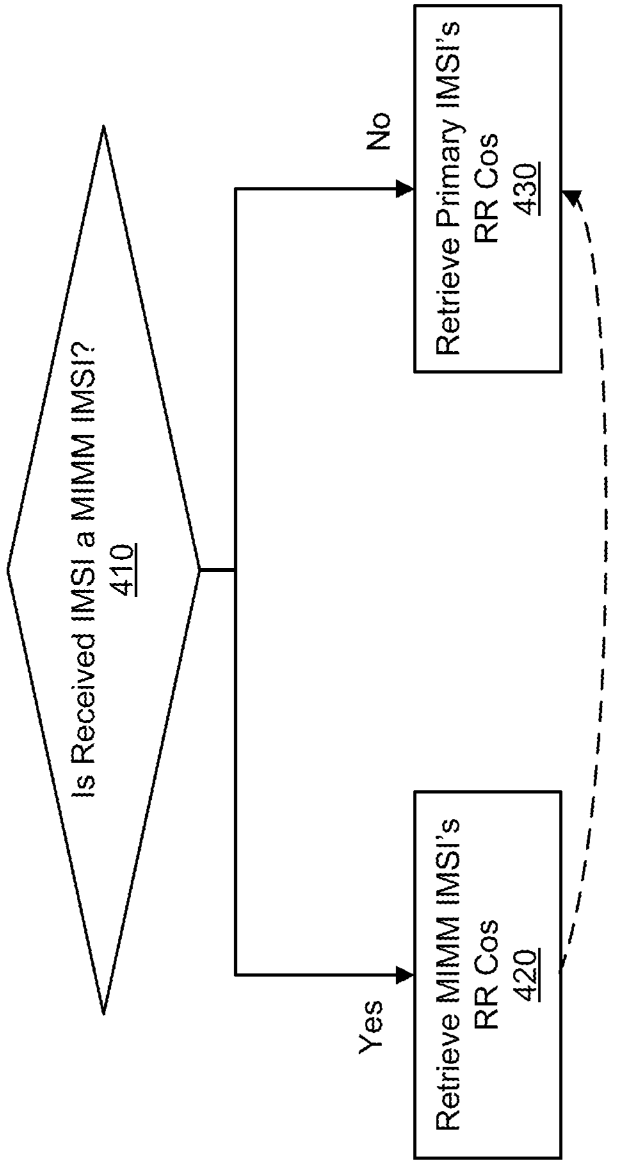
FIG. 4 provides a process to add a new attribute corresponding with the NR as Secondary RAT identifier, in accordance with some examples of the disclosure.

FIG. 4 provides a process to add a new attribute corresponding with the NR as Secondary RAT identifier, in accordance with some examples of the disclosure. In this example, the NR as Secondary RAT identifier optionally allows the system to utilize the MIMM IMSIs RR COS instead of the Primary IMSIs RR COS when applying the "NR as Secondary RAT" value to the Access-Restriction-Data AVP for profile downloads in the S6a/S6d ULA response and S6a/S6d IDR request messages.

For example, the ULR Request message may reference the Primary IMSIs RR COS to override the "NR as Secondary RAT" (lines 7635 and 7636) instead of considering the inbound IMSI being a MIMM IMSI. When implemented, HSS 140 may utilize the corresponding MIMM IMSI's RR COS instead. Similar logic is performed for Event Handler processing to generate S6a and S6d IDR messages.

At block 410, the process may determine if the received IMSI (or other identifier described herein) is a MIMM IMSI. This determination may help the process consider override capabilities of the HSS regarding "NR as Secondary RAT" for the particular IMSI. If yes, the process may proceed to block 420. If not, the process may proceed to block 430.

At block 420, the process may retrieve the MIMM IMSI's RR COS for the received IMSI. As discussed herein with FIG. 1, the HSS 140 may use the MIMM IMSI's RR COS instead of the Primary IMSI's RR COS to perform override functionality for the "NR as Secondary RAT" attribute of the Access-Restriction-Data AVP. The result of applying the newly provisioned MIMM's RR COS may override the subscriber's profile value corresponding to the "NR as Secondary RAT" value.

At block 430, the process may retrieve the Primary IMSI's RR COS for the received MIMM IMSI. This may be the default value without overriding functionality.

In some examples, the RR COS may be selected based on which override values are available at the subscriber server or other data store. For example, the RR COS can be the MIMM IMSI's RR COS when it is defined as the override value. In other examples, the RR COS can resort back to the Primary IMSI's RR COS when the MIMM IMSI's RR COS is not specified, even though the received IMSI is identified as a MIMM IMSI (illustrated by the dashed line in FIG. 4).

Figure 5:
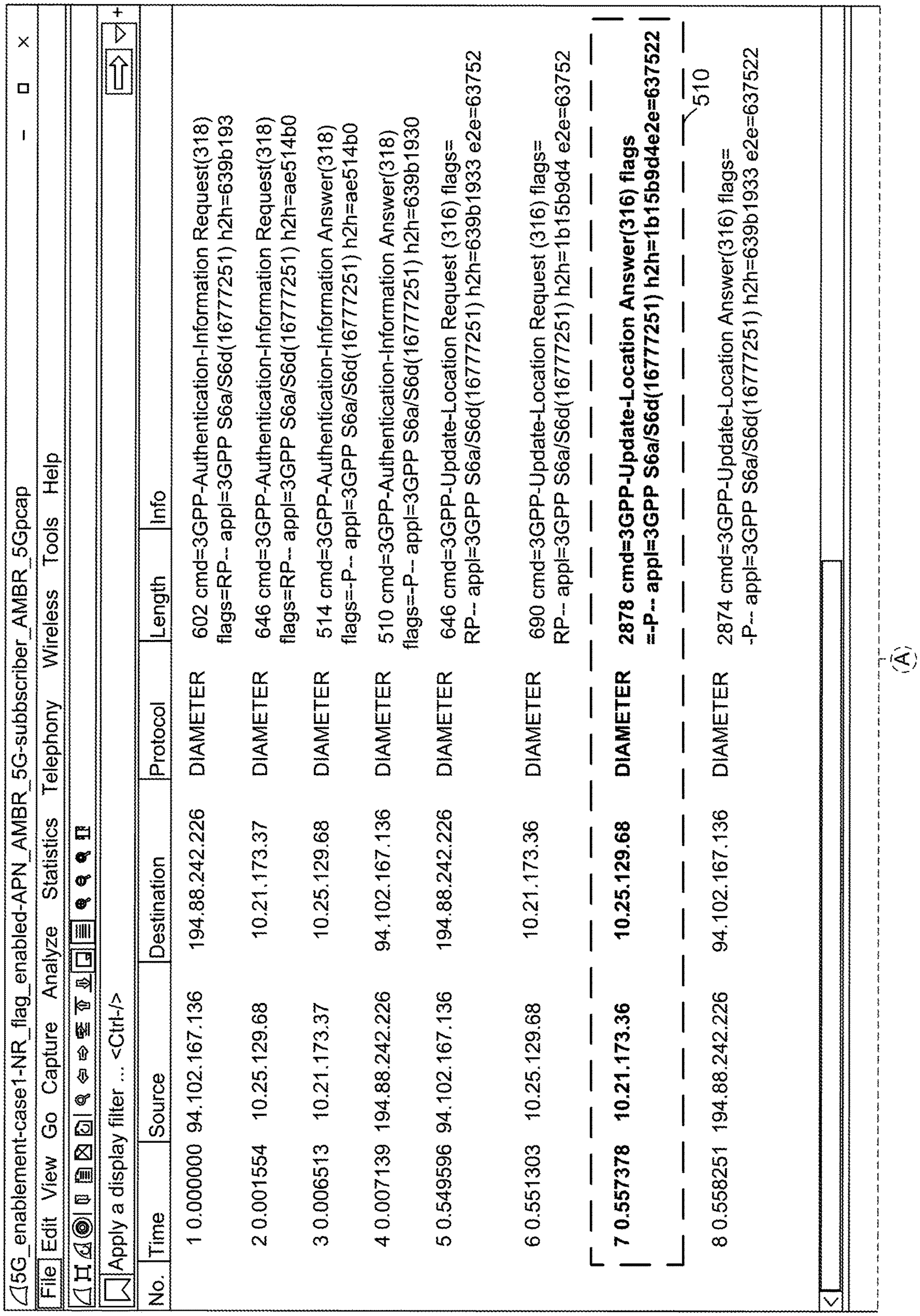
FIG. 5 provides illustrative data packets captured from a network connection that implements the NR as Secondary RAT identifier, in accordance with some examples of the disclosure.
Figure 5:
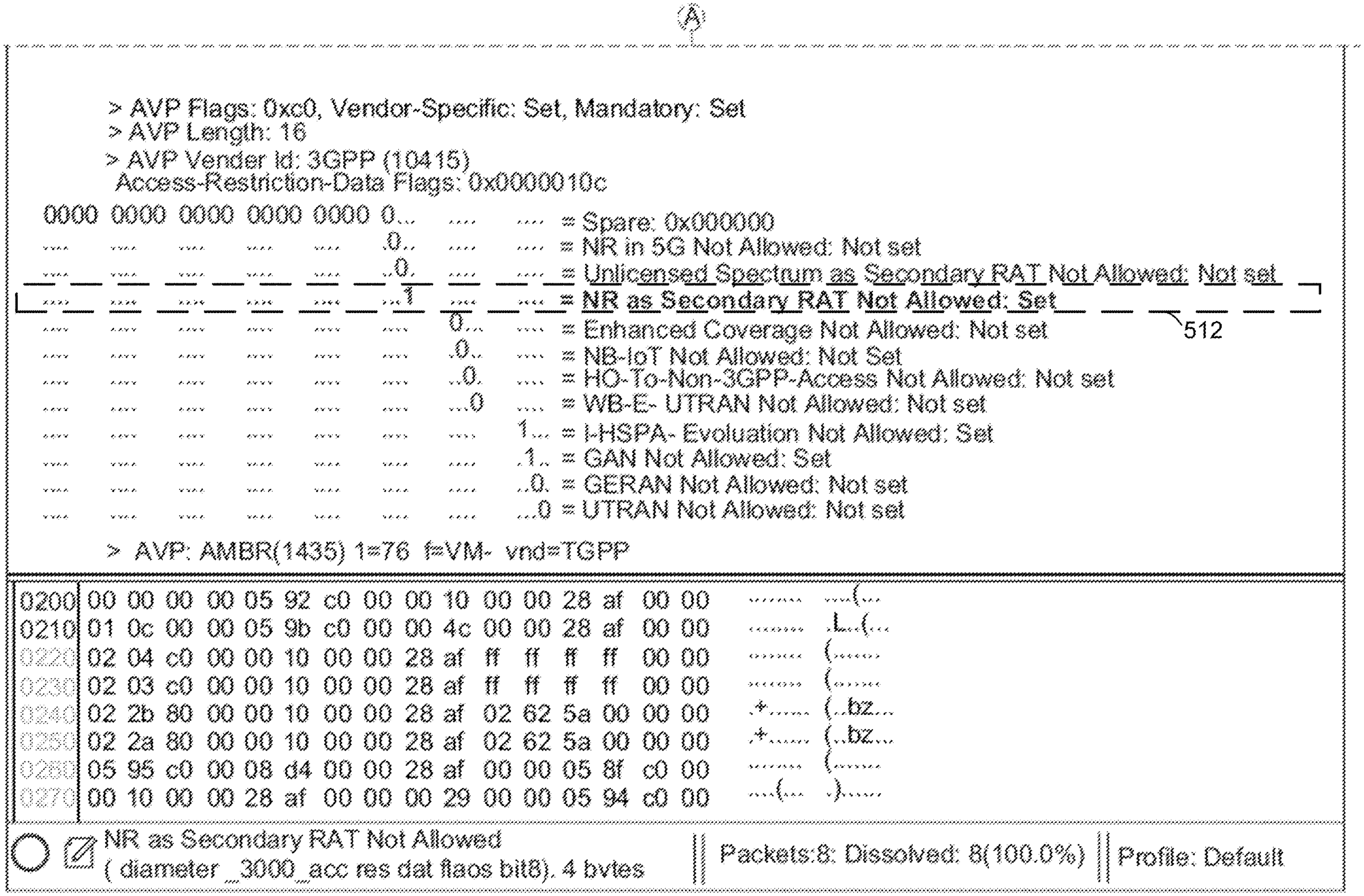

FIG. 5 provides illustrative data packets captured from a network connection that implements the NR as Secondary RAT identifier, in accordance with some examples of the disclosure. In this illustration, a single data packet is highlighted in example 510 and, in response, the ULA response comprises a value 512 for the "NR as Secondary RAT" set to "DENY-1" instead of "ALLOW-0." The system may set the "DENY" value of the "NR as Secondary RAT" identifier due to the Primary IMSI's RR COS being used instead of the corresponding MIMM IMSI's RR COS.

Figure 6:
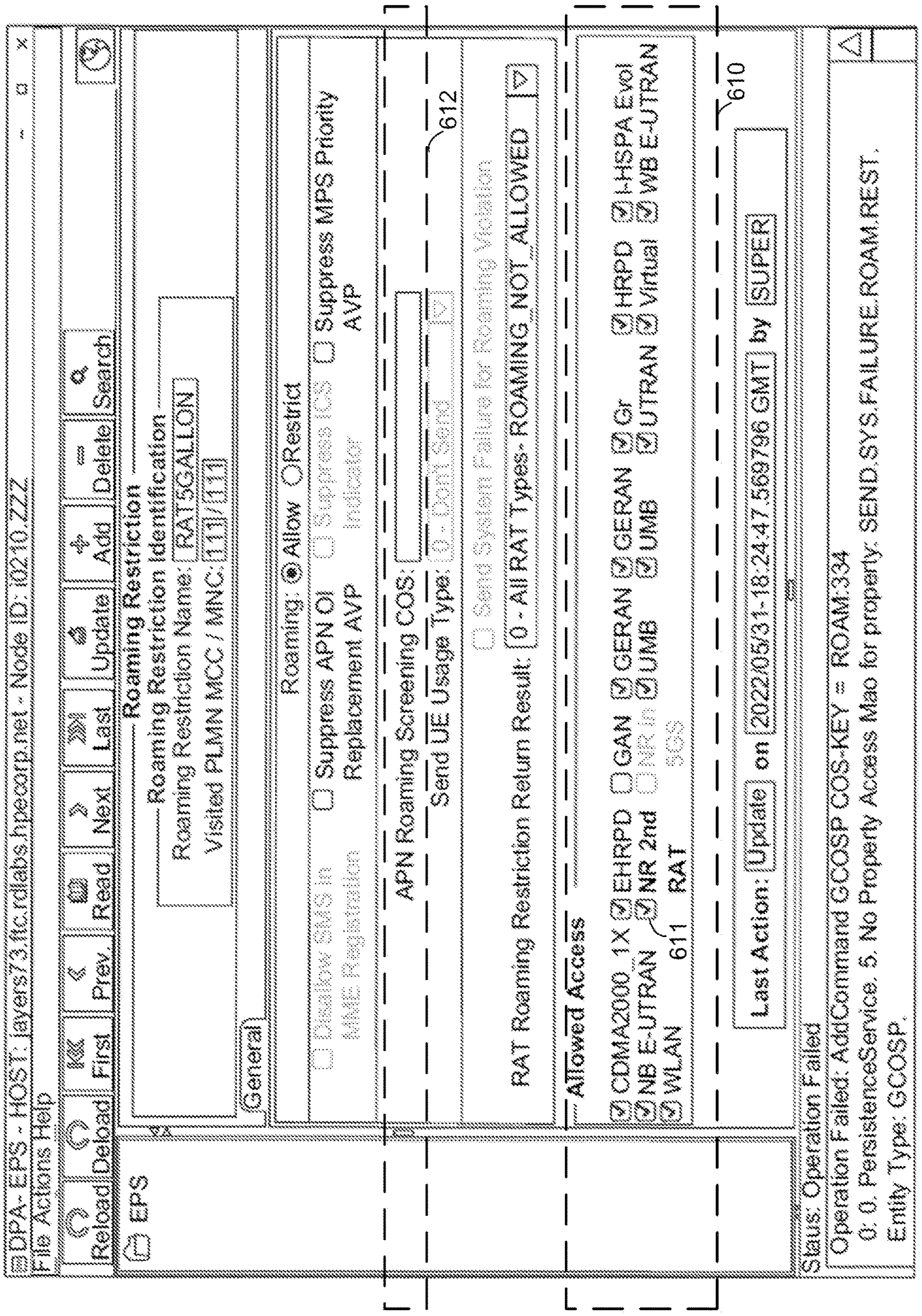
FIG. 6 illustrates the RR COS that contains an illustrative override value for NR as Secondary RAT identifier, in accordance with some examples of the disclosure.

FIG. 6 illustrates the RR COS that contains an illustrative override value for NR as Secondary RAT identifier, in accordance with some examples of the disclosure. In this example, an interface is provided with a plurality of override values 610. Various aspects of the profile can be overridden in interface portion 610, including an NR as Secondary RAT identifier 611. In a second interface portion 612, the RR COS value may be received from a database or subscriber server and overridden. Various services that are allowed for access (as discussed with FIG. 2, and also the "NR as Secondary RAT" value) can be configured to ALLOW or DENY in these and other interface portions. When the NR as a Secondary RAT value is activated, any of these service values can be applied as overriding values to the subscriber's profile corresponding value. The roaming value may be identified from the roaming subscriber's COS along with the network element identifier (e.g., IMSI, etc.)(not shown) to help determine if the UE resides in a certain jurisdiction, in addition to the override values.

In some examples, the service values can be downloaded from HSS 140 (e.g., the subscriber's profile) and the NR as a Secondary RAT can be received from the UE or subscriber itself.

Figure 7:
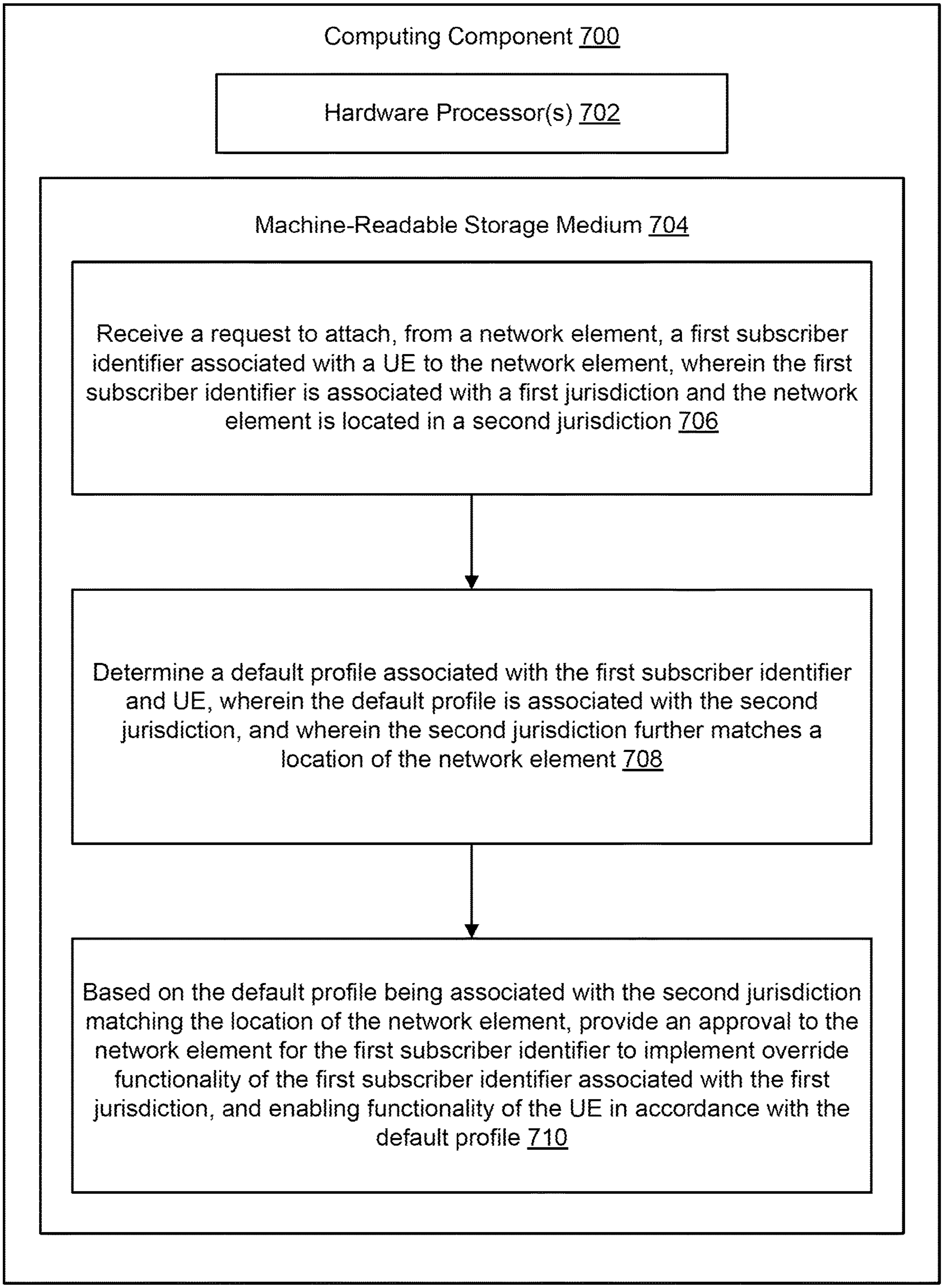
FIG. 7 is an example computing component that may be used to implement various features in accordance with the implementations disclosed herein.

FIG. 7 is an example computing component 700 that may be used to implement various features of the elements, network functions, etc. illustrated in any of FIGS. 1-6 in accordance with one embodiment of the disclosed technology. Computing component 700 may be, for example, a server computer, a controller, or any other similar computing component capable of processing data. In the example implementation of FIG. 7, the computing component 700 includes a hardware processor 702, and machine-readable storage medium 704.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-710. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-710.

Hardware processor 702 may execute instruction 706 to receive a request to attach, from a network element, a first subscriber identifier associated with a User Equipment (UEs) to the network element. The first subscriber identifier may be associated with a first jurisdiction and the network element may be located in a second jurisdiction.

Hardware processor 702 may execute instruction 708 to determine a default profile associated with the first subscriber identifier and UE. The default profile may be associated with the second jurisdiction. The second jurisdiction may further match a location of the network element.

Hardware processor 702 may execute instruction 710 to provide approval to the network element for the first subscriber identifier to override functionality of the first subscriber identifier associated with the first jurisdiction, and enable functionality of the UE in accordance with the default profile. The override functionality may be based on the default profile being associated with the second jurisdiction matching the location of the network element.

In some examples, the UE operates in accordance with the default profile while the UE is located in the second jurisdiction, without implementing the override functionality for the jurisdiction.

Computing components and devices, such as computing component 700, may include a main memory, such as a RAM, cache and/or other dynamic storage devices, coupled to a bus for storing information and instructions to be executed by a processor of the computing component or devices. The main memory also may be used for storing temporary variables or other intermediate information during execution of instructions to be executed by the processor, for example, as described above in connection with FIG. 7. Such instructions, when stored in storage media accessible to the processor, render computer component into a special-purpose machine that is customized to perform the operations specified in the instructions.

The computing components and devices may further include a read only memory (ROM) or other static storage device coupled to the bus for storing static information and instructions for the processor. A storage device, such as a magnetic disk, optical disk, or USB thumb drive (Flash drive), etc., may be provided and coupled to the bus for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computing components and devices may implement the techniques described herein using customized hard-wired logic, one or more ASICs or FPGAs, firmware and/or program logic which in combination with the computing component causes or programs the computing component to be a special-purpose machine. According to one embodiment, the techniques herein are performed by the computing components and devices in response to processor(s) executing one or more sequences of one or more instructions contained in the main memory. Such instructions may be read into the main memory from another storage medium. Execution of the sequences of instructions contained in the main memory causes the processor(s) to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory, such as the main memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise the bus. Transmission media can also take the form of acoustic or light waves, such as those generated during radio-wave and infra-red data communications.

The computing components and devices may also include a network interface coupled to the bus. The network interface provides a two-way data communication coupling to one or more network links that are connected to one or more local networks. For example, the network interface may be an integrated services digital network (ISDN) card, cable modem, satellite modem, or a modem to provide a data communication connection to a corresponding type of telephone line. As another example, the network interface may be a local area network (LAN) card to provide a data communication connection to a compatible LAN (or WAN component to communicated with a WAN). Wireless links may also be implemented. In any such implementation, the network interface sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through the network interface, which carry the digital data to and from computing components and devices, are example forms of transmission media.

The computing components and devices can send messages and receive data, including program code, through the network(s), network link and the network interface. In the Internet example, a server might transmit a requested code for an application program through the Internet, the ISP, the local network and the network interface.

The received code may be executed by the processor as it is received, and/or stored in the storage device, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A subscriber server comprising:

a memory; and one or more processors, that are configured to execute machine readable instructions stored in the memory for performing a method comprising:

receiving a request to attach, from a network element, a first subscriber identifier associated with a User Equipment (UEs) to the network element, wherein the first subscriber identifier is associated with a first jurisdiction and the network element is located in a second jurisdiction, and wherein the first subscriber identifier is configured with a new radio (NR) as Secondary Radio Access Technology (RAT) as allowed;

determining a default profile associated with the first subscriber identifier and UE, wherein the default profile corresponds with a roaming restrictions class of service (COS), wherein the default profile is associated with the second jurisdiction, and wherein the second jurisdiction further matches a location of the network element; and based on the default profile being associated with the second jurisdiction matching the location of the network element, providing an approval to the network element for the first subscriber identifier to implement override functionality of the first subscriber identifier associated with the first jurisdiction, and enabling functionality of the UE in accordance with the default profile, wherein the UE operates in accordance with the default profile while the UE is located in the second jurisdiction.

2. The subscriber server of claim 1, wherein the subscriber identifier is an International Mobile Subscriber Identity (IMSI).

3. The subscriber server of claim 1, wherein the default profile is determined from an Evolved Packet System (EPS) subscription data.

4. The subscriber server of claim 1, wherein a subscriber associated with the UE will opt into the NR as Secondary RAT identifier configuration.

5. The subscriber server of claim 4, wherein the override functionality is based on receiving the NR as Secondary RAT identifier with a value of "ALLOW" associated with the default profile instead of a value of "DENY" associated with the first subscriber identifier.

6. The subscriber server of claim 4, wherein the override functionality is based on receiving the NR as Secondary RAT identifier with a value of "DENY" associated with the default profile instead of a value of "ALLOW" associated with the first subscriber identifier.

7. The subscriber server of claim 4, wherein the override functionality is based on receiving the NR as Secondary RAT identifier with a value of "ALLOW" associated with the default profile, without changing the value associated with the override functionality.

8. The subscriber server of claim 1, wherein the first subscriber identifier is a primary IMSI for the default profile.

9. The subscriber server of claim 1, wherein the network element is a Mobility Management Entity (MME) or Serving General Packet Radio Service (GPRS) Support Node (SGSN).

10. The subscriber server of claim 1, further comprising:

scanning a register for a third subscriber identifier;

determining a protocol format for a device associated with the third subscriber identifier, wherein the protocol format is different than a format of a first cancellation notice associated with the network element; and transmitting a second cancellation notice in accordance with the protocol format to the device.

11. A method of implementing a subscriber system comprising:

receiving, from a network element, a request to attach a first subscriber identifier associated with a User Equipment (UEs) to the network element, wherein the first subscriber identifier is associated with a first jurisdiction and the network element is located in a second jurisdiction, and wherein the first subscriber identifier is configured with a new radio (NR) as Secondary Radio Access Technology (RAT) as allowed;

determining a default profile associated with the first subscriber identifier and UE, wherein the default profile corresponds with a roaming restrictions class of service (COS), wherein the default profile is associated with the second jurisdiction that matches a location of the network element in the second jurisdiction; and based on the default profile being associated with the second jurisdiction matching the location of the network element, providing an approval to the network element for the first subscriber identifier to override functionality of the first subscriber identifier associated with the first jurisdiction, and enabling functionality of the UE in accordance with the default profile, wherein the UE operates in accordance with the default profile while the UE is located in the second jurisdiction.

12. The method of claim 11, wherein the default profile is determined from an Evolved Packet System (EPS) subscription data.

13. The method of claim 11, wherein the first subscriber identifier is a primary IMSI for the default profile.

14. A non-transitory computer-readable storage medium storing a plurality of instructions executable by one or more processors, the plurality of instructions when executed by the one or more processors cause the one or more processors to:

receive, from a network element, a request to attach a first subscriber identifier associated with a User Equipment (UEs) to the network element, wherein the first subscriber identifier is associated with a first jurisdiction and the network element is located in a second jurisdiction, and wherein the first subscriber identifier is configured with a new radio (NR) as Secondary Radio Access Technology (RAT) as allowed;

determine a default profile associated with the first subscriber identifier and UE, wherein the default profile corresponds with a roaming restrictions class of service (COS), wherein the default profile is associated with the second jurisdiction that matches a location of the network element in the second jurisdiction; and based on the default profile being associated with the second jurisdiction matching the location of the network element, provide an approval to the network element for the first subscriber identifier to implement override functionality of the first subscriber identifier associated with the first jurisdiction, and enable functionality of the UE in accordance with the default profile, wherein the UE operates in accordance with the default profile while the UE is located in the second jurisdiction.

15. The non-transitory computer-readable storage medium of claim 14, wherein the first subscriber identifier is a primary IMSI for the default profile.

16. The non-transitory computer-readable storage medium of claim 14, wherein a subscriber associated with the UE will opt into the NR as Secondary RAT identifier configuration.

* * * * *